INVENTORS.
LAURENT REGIMBAL
BY   FRED THURMER
ATTORNEY.

Jan. 11, 1955 L. REGIMBAL ET AL 2,699,172
MACHINE FOR STRIPPING HOP VINES
Filed May 16, 1950 6 Sheets-Sheet 3

Jan. 11, 1955     L. REGIMBAL ET AL     2,699,172
MACHINE FOR STRIPPING HOP VINES

Filed May 16, 1950     6 Sheets-Sheet 4

INVENTORS.
LAURENT REGIMBAL
BY    FRED THURMER

ATTORNEY.

Jan. 11, 1955
L. REGIMBAL ET AL
2,699,172
MACHINE FOR STRIPPING HOP VINES
Filed May 16, 1950
6 Sheets-Sheet 5
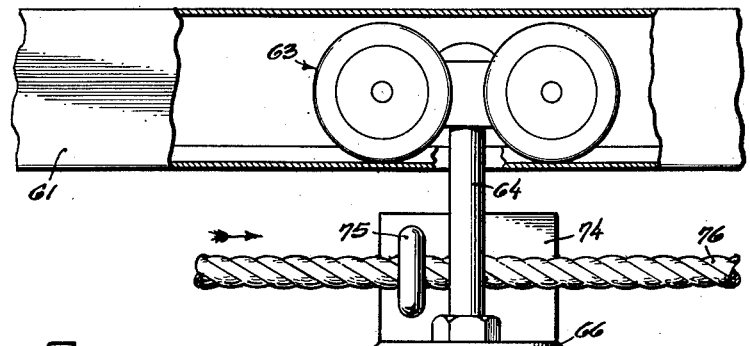
Fig. 6
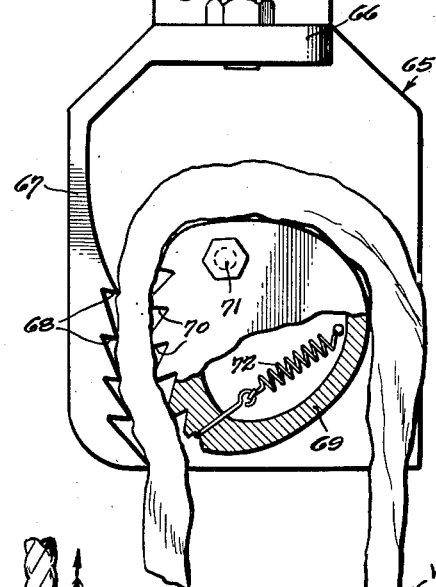
Fig. 7
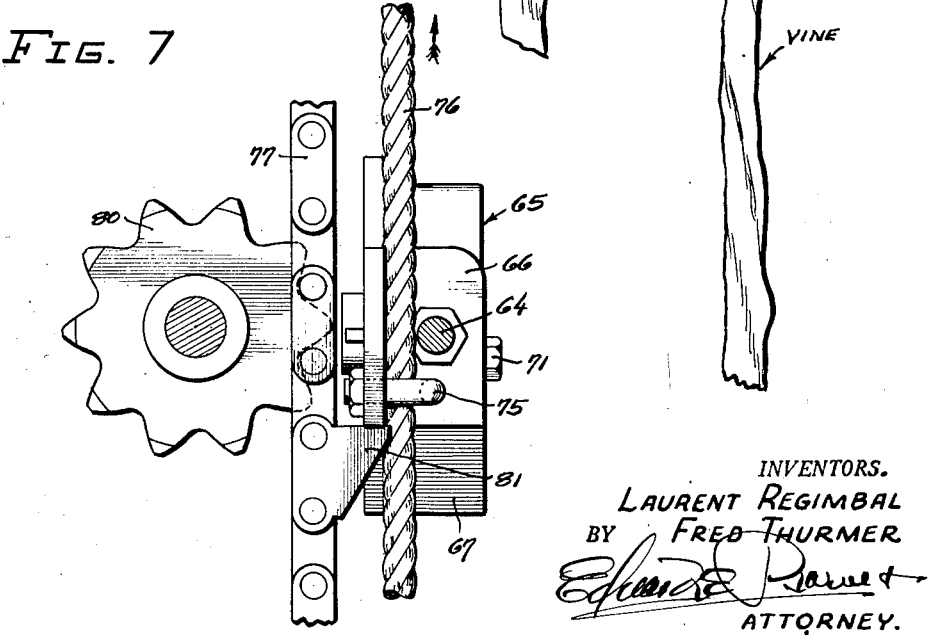
INVENTORS.
LAURENT REGIMBAL
BY FRED THURMER
ATTORNEY.

Jan. 11, 1955   L. REGIMBAL ET AL   2,699,172
MACHINE FOR STRIPPING HOP VINES
Filed May 16, 1950   6 Sheets-Sheet 6

INVENTORS.
LAURENT REGIMBAL
BY  FRED THURMER

ATTORNEY.

United States Patent Office 2,699,172
Patented Jan. 11, 1955

2,699,172

MACHINE FOR STRIPPING HOP VINES

Laurent Regimbal, Toppenish, and Fred Thurmer, Yakima, Wash.

Application May 16, 1950, Serial No. 162,173

13 Claims. (Cl. 130—30)

This invention relates to the hop-picking art, and especially pertains to a machine for stripping hop vines to divest the same of substantially all the foliage. This is to say that the present invention is concerned with a machine for stripping leaves and branches as well as the hop-bearing flowers from the main stem of the vine and leaving little more than an occasional tributary limb upon the latter. Within the hop-picking art this stripping procedure has developed separate status from the later steps of separating the stripped matter to largely segregate the flowers from twigs and leaves.

The principal object of our invention is to devise a machine in which the vines to be stripped are given continuous travel through a picking zone and wherein fingers working in this zone and which perform a raking function upon opposite sides of the advancing vine move continuously in paths at cross-angles to the directional travel of the vines.

It is a further and particular object to devise a machine for stripping a hop vine characterized in that the vine hangs pendant as it moves through the picking zone and the picking fingers are arranged in horizontal rows with their directional travel downwards.

As a further object still the invention aims to provide a machine in which the downwardly moving columns of rows lying at opposite sides of the advancing vine occupy converging vertical planes to define a flared picking throat which narrows progressively in the direction of the vine's travel, and wherein the rows of fingers disposed at the two sides of the throat are vertically staggered and made to lap one another as they approach the egress end.

The invention has the yet further and important object of devising a hop picking machine embodying the described features and which additionally permits the span across the ingress end of the throat to be adjusted for width in compensation of varying conditions of growth which are found in different runs of hop vines.

As a further object still, the invention aims to provide a hop picking machine of the described character peculiarized in that the suspended free ends of the vines are allowed to readily enter the throat with no tendency to hang back as the forward progress brings the foliage into contact with the downwardly moving fingers.

A yet further object is to provide an improved endless overhead carrier for the hop vines as well as to perfect associated grasper devices for securely holding the butt ends of hop vines.

The invention has the yet further and important object of devising means by which each of the vine-carrying grasper blocks, following its traversal of the picking throat, is caused to be automatically freed of the stripped vine before again reaching a point in the block's endless travel where a fresh vine is hung therefrom.

With these and still other more particular objects and advantages in view, the invention consists in the new method of stripping foliage from the hop vine, and in the novel construction, adaptation, and combinations of the parts of a machine for performing said method.

In the accompanying drawings:

Fig. 6 is an enlarged fragmentary side elevational view, partly broken away and in section, portraying one of the trolley-carriers and its associated grasper block.

Fig. 7 is a fragmentary horizontal sectional view on line 7—7 of Fig. 5.

Figure 1:
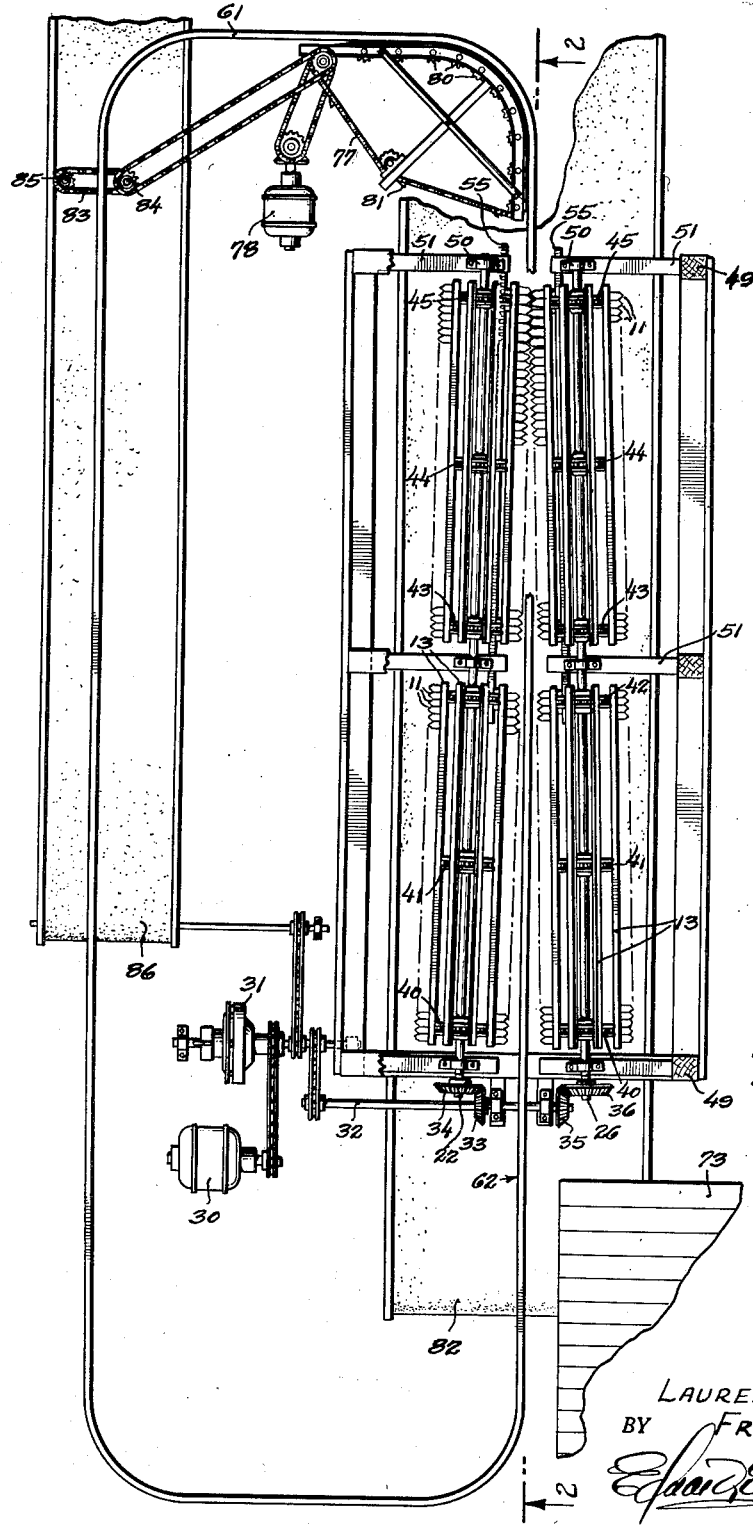
Figure 1 is a top plan view with parts broken away illustrating our new preferred embodiment of a hop-picking machine constructed according to the teachings of the present invention.
Figure 2:
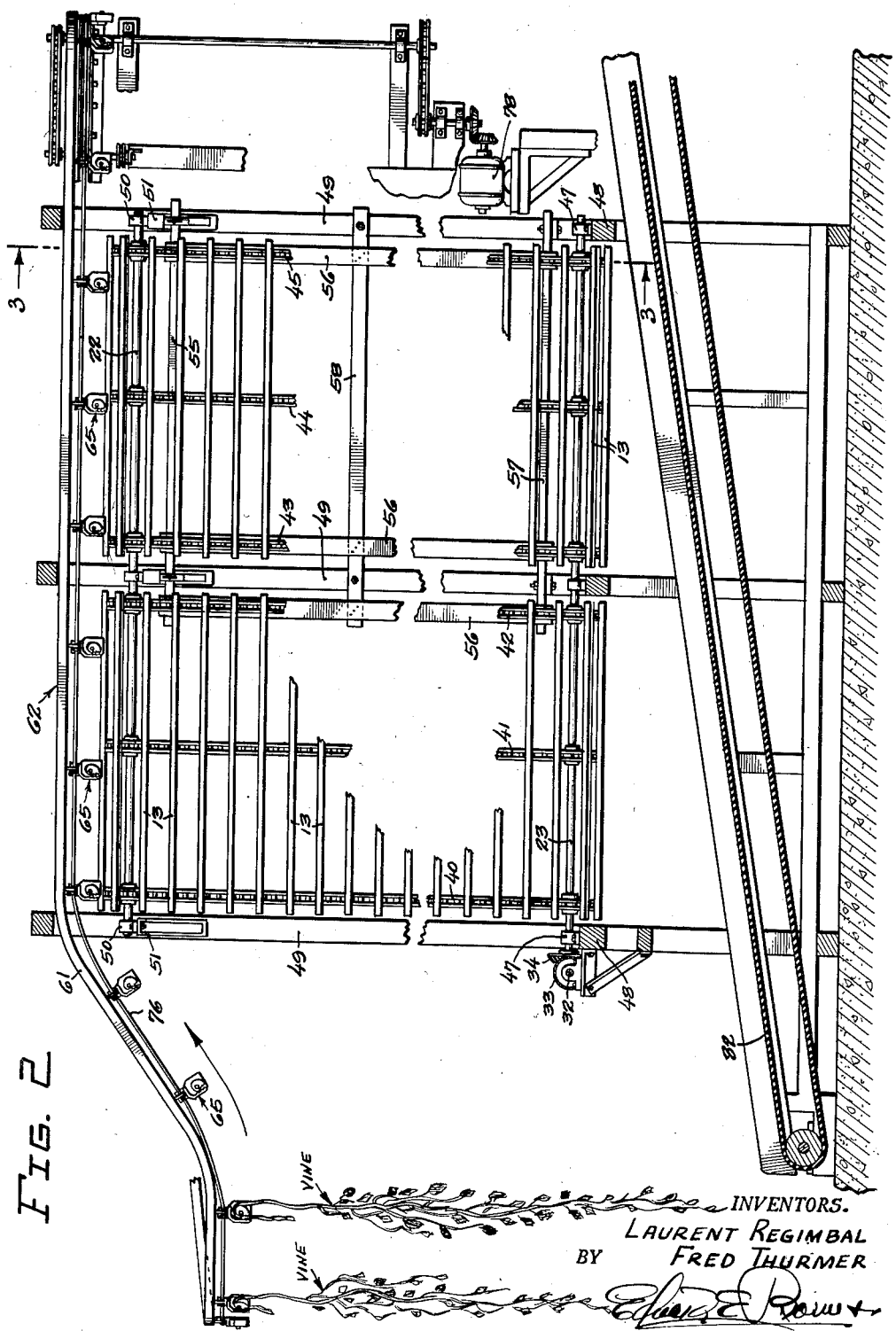
Fig. 2 is a fragmentary longitudinal vertical sectional view on line 2—2 of Fig. 1.
Figure 3:
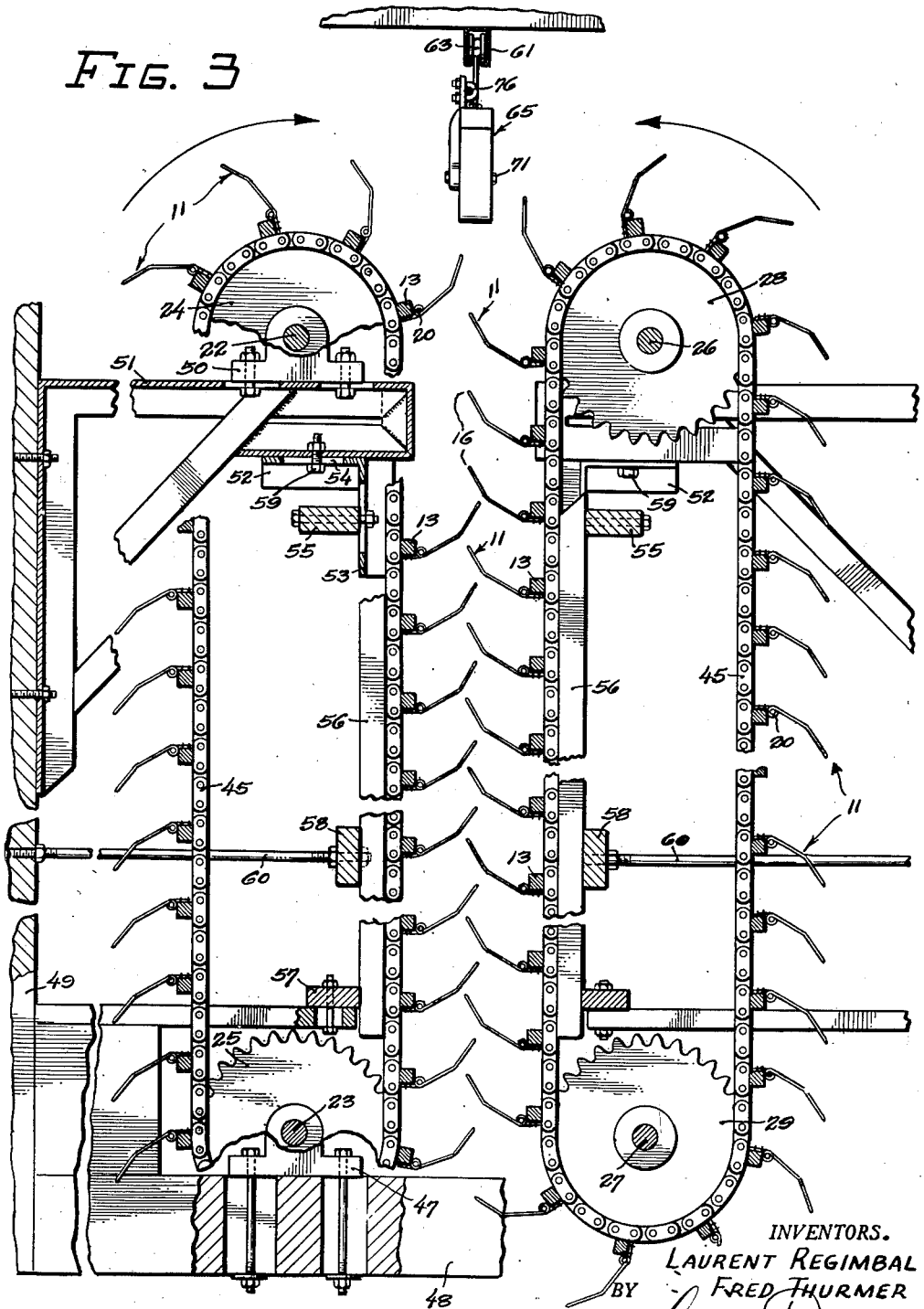
Fig. 3 is a fragmentary transverse vertical sectional view drawn to an enlarged scale on line 3—3 of Fig. 2.
Figure 4:
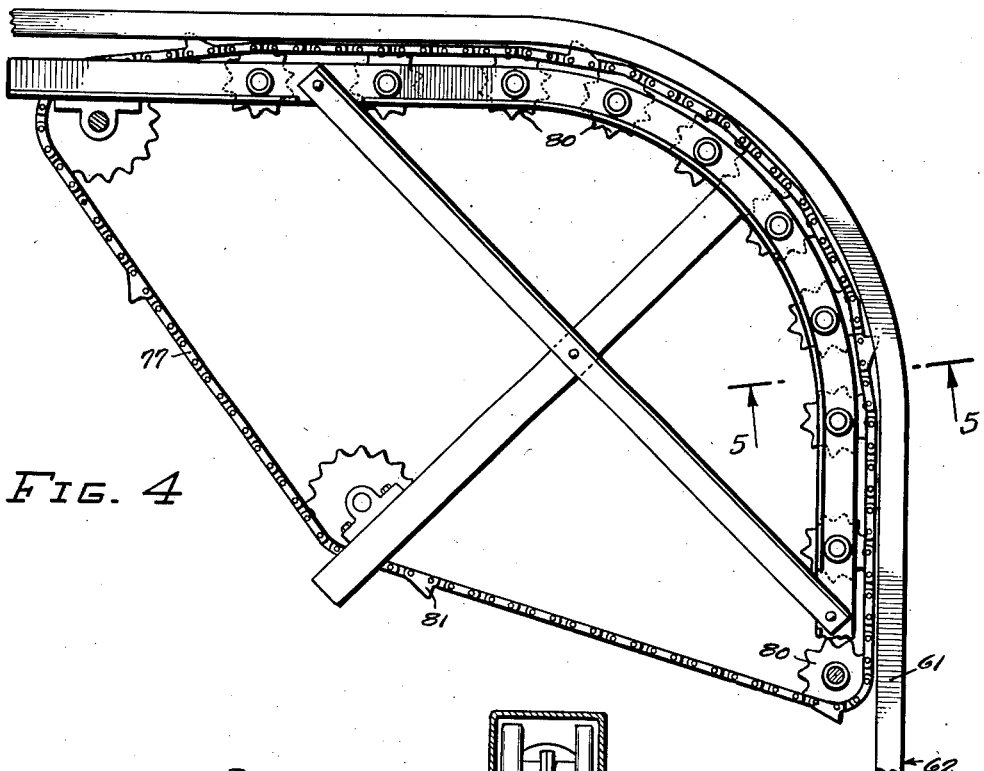
Fig. 4 is a fragmentary top plan view employing a scale corresponding to that of Fig. 3 and detailing the drive mechanism for giving continuous travel to the overhead carrier and the vine-engaging grasper blocks which are carried thereby.
Figure 5:
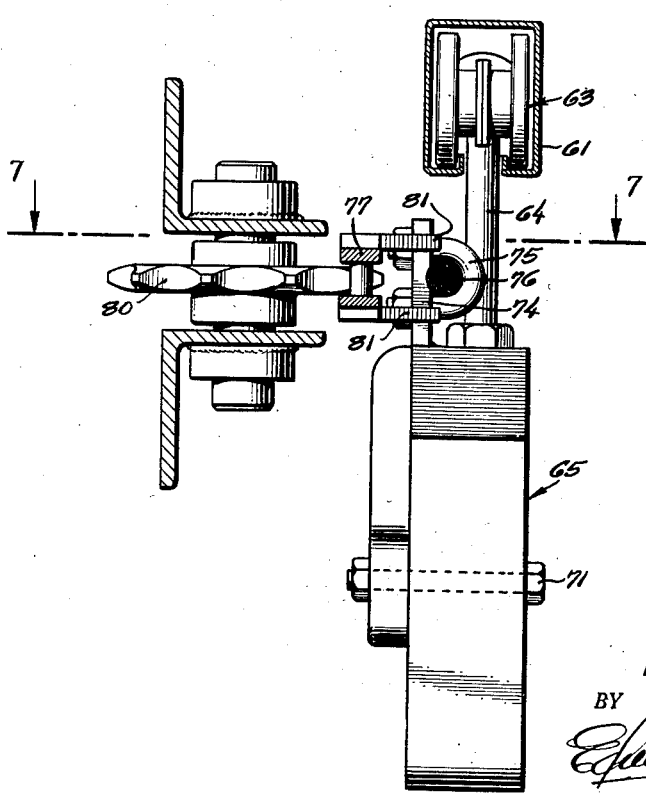
Fig. 5 is a transverse vertical sectional view drawn to an enlarged scale on line 5—5 of Fig. 4.
Figure 8:
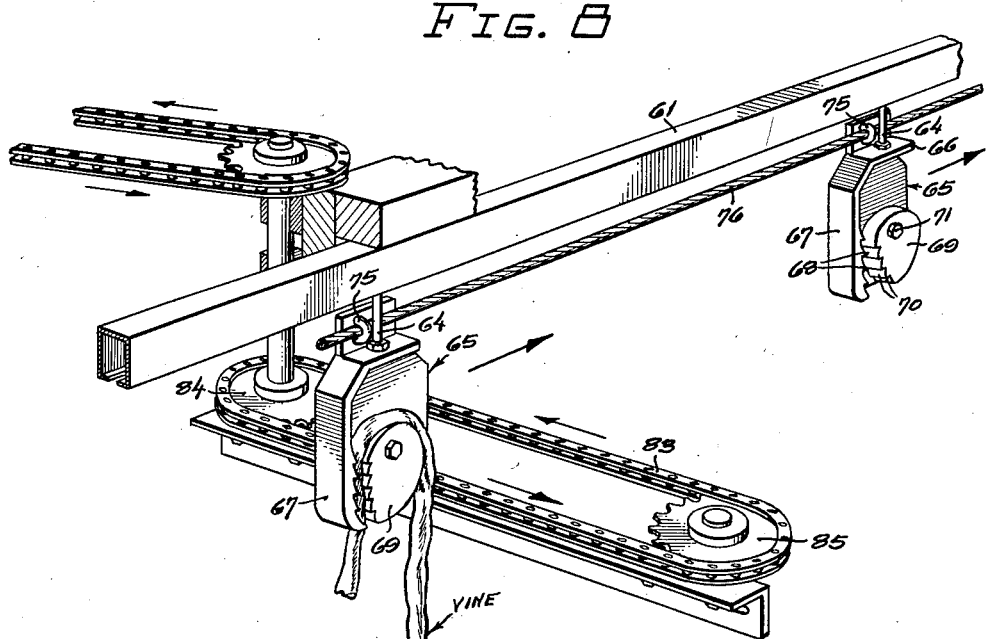
Fig. 8 is an enlarged perspective view showing a fragmentary part of the endless track on which the trolley-carriers ride and illustrating mechanism by which we automatically disengage the stripped hop vines from the grasper blocks as the latter progress beyond the picking throat in their endless travel along the overhead track.
Figure 9:
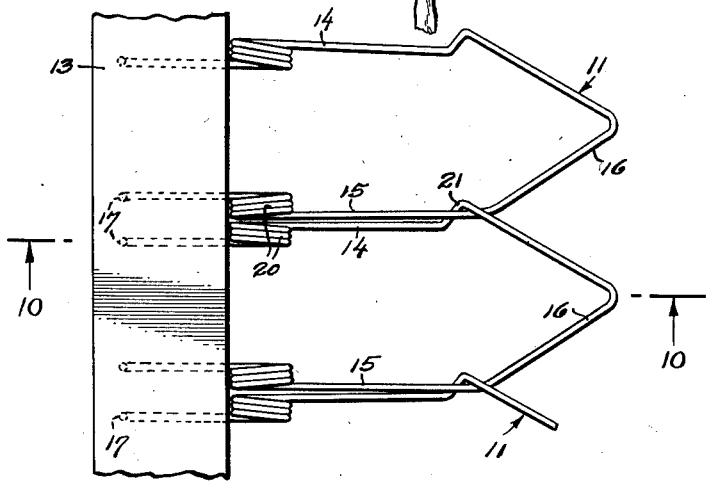
Fig. 9 is an enlarged-scale fragmentary top plan view illustrating the picking fingers which we employ.
Figure 10:
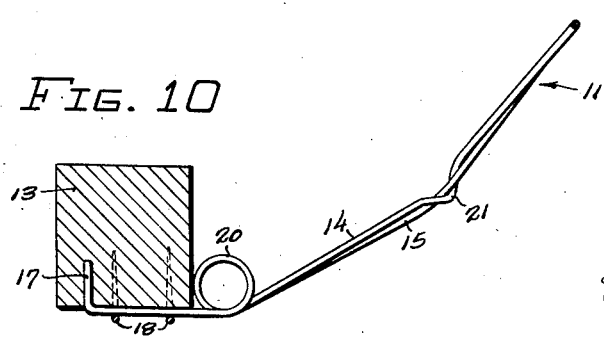
Fig. 10 is a transverse vertical sectional view on line 10—10 of Fig. 9.

The work of stripping the vines is accomplished in the present invention, as with the more successful of the prior machines devised for this purpose, by subjecting the vines to the stripping influence of successive rows of flexible fingers designated generally by the numeral 11. The multiple fingers in each row give much the appearance and perform their intended office in the manner of a comb or rake and it is by the former term that I will hereinafter refer to each row. Arranged in sets, the combs derive support from an endless catepillar-type picker belt and occur as substantial flights running transversely at right angles to the travel path and placed at fairly close equidistantly spaced intervals about the circumference of the belt. The belts preferably comprise spaced chains connected by cross-slats 13, and the comb-forming fingers are secured to these slats. The fingers which we employ are each produced from a length of spring-wire bent upon itself to present spaced parallel shank sections 14—15 joined by a V-shaped tongue extremity 16 and presenting a prong 17 at the free extremity of each limb, the prongs being bent approximately at right angles to the plane occupied by the two shanks. These prongs are driven into the cross-slat and are anchored by complementing staples 18. Each shank contains a spring-forming coil 20 within its length. At the point of juncture between the terminal tongue and one of the two shanks of each finger there is provided a deforming offset 21 and this enables adjoining fingers to be interlocked in a manner clearly apparent from an inspection of Figs. 9 and 10. The fingers are so made and mounted as to cause the V-shaped tongues to slope retrogressively in relation to the direction of travel.

According to the present invention the chains of the said belts are trained about upper and lower sets of sprocket wheels fixedly carried upon axles which are journaled for rotation about spaced vertically aligned horizontal axes, and the belts are employed in pairs with the two belts of each pair being opposingly placed at opposite sides of a longitudinal vertical plane. This is to say that the axles 22 and 23 which carry the sprocket wheels 24 and 25 for one belt of the pair are journaled to lie in vertically spaced parallel relation at one side of the machine and the axles 26 and 27 which carry the sprocket wheels 28 and 29 for the other belt of the pair are journaled to lie in vertically spaced relation at the other side of the machine. The vertical planes occupied by the related upper and lower axles converge toward the rear or tail end of the machine. Viewed from above, a longitudinal throat is described between the inner runs of the belts and from the fact that the two sets of axles lie in converging vertical planes it perforce follows that the throat narrows toward the tail end. Moreover, at the tail end of the machine the extreme inner ends of the combing fingers lap one another, and in compensation of this lapping the successive combs of one belt are staggered in relation to the combs of the other belt whereby each comb, as it travels along its inner run, finds interfitting registration with the interstices which occur between the combs of the other belt.

An electric motor 30 or other suitable source of power common to both belts drives the same in concert, although in different directions of travel, the drive being carried through a clutch 31 to a cross-shaft 32 and thence by intermeshing bevel gears 33—34 and 35—36 to the two axles 23 and 27. The direction in which the belts are driven causes the combs of both belts to move downwardly along the inner run of the related belt's travel. As will appear in the course of the following description, the vines to be picked are supported from an overhead conveyor and, hanging pendant therefrom, move uninterruptedly in a horizontal direction longitudinally of the throat hence causing the combs to rake downwardly along the length of each vine as the latter traverse the throat.

We indicate our machine as having two in-line belts at each side of the throat, but a single said belt or a ganged greater number of belts could feasibly be employed. The illustrated arrangement is one in which three endless chains are provided for each belt, located one chain at each end and the other chain intermediate the two end chains. For each set of two in-line belts there are consequently provided six chains and inasmuch as parts hereinafter to be described are related to certain of said chains the six chains are designated, in the order of the occurrance from front to rear of the machine, by 40, 41, 42, 43, 44 and 45. The axles, which are made common to all six chain-carrying sprocket wheels, run the full length of the machine, and are carried by pillow blocks placed at the two end extremities of the machine and at a center point lying between the in-line belts.

It should be here pointed out that the foliage may be quite heavy on some runs of hop vines and comparatively light on others, and it becomes desirable, therefor, that provision be made for setting the admission end of the throat to either a wide or a narrow opening in order that the combing fingers will be effective upon the vines throughout substantially the full length of the throat. We attain this end by slidably mounting the center pillow blocks and the front-end pillow blocks for transverse adjustment. The rear-end pillow block is or may be stationary. In compensation of such adjustment the bearings proper are set in rubber to make the same self-aligning. The lower-level pillow blocks, designated by 47, rest upon and are adjustably bolted to transverse spanning timbers 48 extending between side posts 49 of a suitable framework, and the upper-level blocks 50 rest upon and are adjustably bolted to a respective inwardly directed bracket 51 secured to said posts. By this token it will be seen that three such brackets are provided at each side of the machine, one at the center and the other two at the ends. Both the rear-end bracket and the center bracket have an angle-shaped fitting secured to the underside of its free inner end, and such fitting is made transversely adjustable toward or from the throat. The fitting which we employ is fabricated from two lengths of joined channel-iron stock and has the web section of each of its two legs 52 and 53 longitudinally slotted. The leg 52 underlies the bracket arm and is secured thereto by a bolt 59 received through the slot 54. The other leg 53 serves as a pendant hanger, and gives support to a horizontal stringer 55 which runs longitudinally and extends somewhat more than half the length of the machine from the rear-end limit thereof to and slightly beyond the transverse vertical plane occupied by the chain 42. This chain, as well as the chains 43 and 45, are each given a backing support as they move along their inner-run travel by being caused to ride upon vertical shoes 56 spiked or otherwise attached at their upper ends to the described stringer and localized at their lower ends by a second longitudinal stringer 57 which, like the stringer 55, is secured for transverse adjustment to the framework of the machine. In addition to these top and bottom connections the shoes 56 may, if desired, be also localized at the center by a stringer 58 stabilized by a stay-rod 60 which is made adjustable for length.

Proceeding now to describe the conveyor system by which we feed the hop vines in a pendant condition through the foliage-stripping throat, the overhead track which we employ is or may be a standard barn-door channel track, designated by 61. Considered in top plan this track is endless and traces a more or less rectangular pattern with one side or section 62 of the rectangle, hereinafter termed the feed side, coinciding with the longitudinal vertical center line of the throat and the two ends lying well beyond the front and rear end limits of the picker proper. These ends merge with the sides by comparatively gradual bends. A connected train of trolley-carriages 63 rides along the track, with the carriages placed at equidistantly spaced intervals of the circumference, and each of these carriages presents a pendant hanger-bolt 64 to which a grasper block 65 is rigidly secured.

Made as a special casting, this block presents a bolt-engaging horizontal web 66 at the top and along the rear edge provides a vertical flange 67 prolonged as a continuation of this web, and formed in the back face of this flange are a series of downwardly-pointing ratchet-like teeth 68 serving as a stationary jaw. As a complement to this stationary jaw there is eccentrically pivoted upon the block a hollow disc 69 having in its perimeter a series of ratchet-like teeth 70 opposed to the teeth 68. The eccentric pivot 71 lies above the horizontal center of the jaws and the jaws hence close by a clock-wise swing of the disc. An extension spring 72 is housed within the hollow center of the disc and attaches by one end to the disc and by its other end to the block body in such a manner as normally to effectuate a counter-clockwise jaw-opening movement of the disc. The disc presents a rather wide rim and a vine which is to be grasped by the grasper block is looped by an operater over this rim. The operator performing such work stands upon an upper-level platform 73 located at the front end of the machine and bends the root or butt end of the vine to form the loop, placing the loop over the rim of the disc and then pressing the movable jaw inwardly to initiate a bite whereupon the pendant weight of the long or foliage-carrying end of the vine tightens the movable jaw upon the vine.

Each of the said grasper blocks presents an upstanding lug 74 located to the rear of the hanger-bolt 64, and a saddle-notch is grooved horizontally along the front face of this lug. A flexible cable 76 acting to couple the multiple grasper blocks in an endless train seats in this notch and is made secure to the lug by a shackle-bolt 75.

Continuous travelling energy is given to the connected train of grasper blocks by an endless drive chain 77 powered in any suitable manner, as by an electric motor 78, and this chain is so guided by sprocket wheels 80 as to cause one run of the chain to trace a curving path parallel to and alongside the bend of the track which occurs at the tail end of the track's feed side 62. The horizontal plane occupied by this chain coincides with that of the cable 76. Pairs of vertically spaced ears 81 are carried by separated links of the chain to occur at spaced intervals corresponding to the spacing of the grasper blocks, and these ears straddle the cable and take a purchase against the back edge of the lugs 74.

From the foregoing it will be understood that the operator loads the empty grasper blocks as the same successively pass before him in their continuous travel to the picker proper, and as the hanging vines are then carried into the throat and move progressively from the open to the closed end of the latter the downwardly moving combs rake the vines, initially picking only the outside foliage and then penetrating continually deeper until finally substantially the entire vine is stripped as the travelling grasper blocks are caused to traverse the full length of the picker belts. At the wide ingress end of the throat the belts are free to partake of a slight outward bellying in order to freely admit the travelling vines, and contrary to what might be expected it is a peculiarity of the present machine that the hanging free end of the vine, once the same has been engaged by the combing fingers, tends to slightly lead rather than follow the grasped butt end.

Distinguished from hop-picking machines as they have been heretofore known and which cause the hop-picking fingers to penetrate the full depth of the foliage throughout substantially the entire picking operation, the fact that the present invention initially works on only the side-edge portion of the foliage and then causes the fingers to penetrate with progressive travel of the vines is found to be especially advantageous as protection against mutilation of the hop-bearing flowers and a greater separation of the picked foliage, and which is to say that the flowers, leaves and twigs which fall from the bottom end of the throat are separated into smaller clusters and the later segregation of the flowers is considerably facilitated. While the machine by which we accomplish the work of separating the flowers from other stripped foliage embodies several distinct improvements the same is no part of the present invention and suffice it to here say that the stripped foliage falls from the throat onto a subjacent endless conveyor belt 82 whence it is carried to the separator.

A feature of the present invention is the provision of a means by which the grasper blocks are freed of the stripped vines automatically as they travel beyond the picking belts. Said means comprises an endless chain 83 extending transverse to the track and trained about driving and idler sprocket wheels 84—85 for movement in a horizontal plane located slightly below the travel path of the grasper blocks. The run of the chain which lies proximal to the advancing blocks travels in an outward direction and as the hanging long end of the vine which is draped over the front edge of the grasper disc 69 comes into contact with the outwardly moving chain links the vine is frictionally caught by the links and slipped thereby off the top rim of the disc, the weight center then shifting to the back edge of the disc. This shift of the weight center is self-sufficient to open the jaws and release the vine, the spring 72 serving only to yieldingly maintain the jaws in an open condition as the blocks move beyond the vine-releasing chain in their travel to the loading platform 73. In the rare circumstance that a vine should by chance resist the frictional pull of the chain and fail to slip off the rim of the disc 69, there is still no liability of the same hanging up on the chain in that it will simply move outwardly with the latter and pass with the chain around the tail sprocket wheel, thence proceeding with the moving grasper block and allowing the operator to manually remove the vine as the block reaches the loading platform. We find that there is no need for any lugs or other projections upon the chain, friction alone being sufficient to effectively slip the vines off the rims. The released vines drop onto an endless conveyor 86 which carries the same to a chopper (not shown).

The invention and the manner of its operation should be clear from the foregoing description of our now preferred illustrated embodiment. Changes in the details of construction may be resorted to without departing from the spirit of the invention and we accordingly intend that no limitations are to be implied and that the hereto annexed claims will be given a scope fully commensurate with the broadest interpretation to which the employed language admits.

What we claim is:

1. In a hop picking machine, a machine frame, two sets of upper and lower axles journal-mounted from the frame one alongside the other for rotation about horizontal axes in two converging vertical planes, a like plurality of sprocket wheels on each axle placed at the two ends and at intervals of the length, endless chains trained about vertically aligned upper and lower sprocket wheels of each of said sets of axles, horizontally extending cross-slats connecting the chains of each set and placed to have the cross-slats of one set of the chains vertically staggered in relation to the cross-slats of the other set of chains, a row of resilient V-shaped picking fingers rigidly secured to extend as substantial flights from each cross-slat, the placement of the chain sets being such that said rows of picking fingers are transversely spaced from one another at the wide end and lap one another at the narrow end of the converging throat defined between the chain sets, correlated means for continuously driving one axle of each set to cause the rows of picking fingers to move downwardly at a corresponding speed as they are carried by the chains along the inner run of the chains, and means for giving continuous horizontal travel to a succession of suspended hop vines to cause the vines to completely traverse the throat working without interruption progressively from the wide to the narrow end of the latter.

2. The hop picking machine of claim 1 in which the axles admit of being swingably adjusted for increasing or decreasing the width of the throat at the admission end thereof.

3. The hop picking machine of claim 2 in which the chains which lie at the wide admission end of the throat are free to belly outwardly by force of pressure from foliage of hop vines as the latter enter the throat and wherein vertical frame-carried backing bars are applied behind the inner runs of the remaining chains to resist said pressure and force the picking fingers to penetrate the foliage, said backing bars being adjustably mounted to allow the same to be bodily shifted inwardly and outwardly in compensation of swing adjustment given to the axles.

4. In a hop picking machine, a machine frame, two sets of vertically aligned upper and lower axles supported from the frame to lie at opposite sides of a longitudinal median and journaled for rotation about horizontal axes, sprocket wheels on the two ends of each axle, endless chains trained about upper and lower sprocket wheels of each of said sets of axles, cross-slats connecting the chain which lies at one end with the chain which lies at the other end of each of said axle sets and placed to have the slats of one set of chains vertically staggered in relation to the cross-slats of the other set of chains, said connected chains each serving as an endless belt, a row of resilient V-shaped picking fingers rigidly secured as a substantial flight to each cross-slat and projecting therefrom such that the reach of the fingers along the inner runs of said belts is short of said longitudinal median at one end of the belts and progressively nears and ultimately laps said median at the other end of the belts, and means for giving continuous horizontal travel to a suspended hop vine to pass the vine between the opposing fingers working completely from the wide to the narrow end limit of the converging throat which is defined between the latter.

5. In a machine for stripping hop vines, a pair of endless spaced belts supported with a respective pair of runs thereof occupying converging vertical planes to define a narrow stripping throat between said opposing runs and provided at spaced intervals of the circumference with transversely extending rows of stripping fingers, means for driving the belts to have the fingers along the two sides of the throat move in a downward direction, a fixed endless track supported to have one section thereof extend along a generally horizontal plane immediately overlying the throat on the substantial median line of the latter, a plurality of conveyor blocks movably supported on the track and each providing means for releasably grasping the butt end of a hop vine to suspend the vine therefrom, drive means functional upon the grasper blocks to cause the same to continuously travel about the track, and means occupying a position along the path travelled by the conveyor blocks and operating automatically by progressive movement of each block beyond the throat to release the stripped vine from the block.

6. In a machine for stripping hop vines, a pair of endless spaced belts supported with a respective pair of runs thereof occupying converging vertical planes to define a narrow flared stripping throat between said runs, each said belt being provided at equidistantly spaced intervals of the circumference with transversely extending rows of stripping fingers, means for driving the belts to have the fingers along the two sides of the throat move in a downward direction, a fixed endless track supported to have one section thereof extend along a generally horizontal plane in immediate overlying relation to the throat on the substantial median line of the latter, a plurality of conveyor blocks movably supported on the track and each providing means for releasably grasping the butt end of a hop vine to suspend the vine therefrom, drive means functional upon the grasper blocks to cause the same to continuously travel about the track, the direction of travel being such as to cause the hanging vine to enter the wide end and leave the narrow end of the stripping throat, and means occupying a position along the path travelled by the conveyor blocks and operating automatically by progressive movement of the block beyond the throat to release the stripped vine from the block.

7. In a machine for stripping hop vines, a pair of endless spaced belts supported with a respective pair of runs thereof occupying converging vertical planes to define a narrow flared stripping throat between said runs, each said belt being provided at spaced intervals of the circumference with transversely extending rows of stripping fingers, means for driving the belts to have the fingers move in a downward direction along the said opposing runs of the belts, a fixed endless track supported to have one section thereof lie horizontally in overhead relation to the belts and in vertical alignment with the longitudinal median line of the throat, a connected train of trolley-carriages riding on the track, a respective grasper block suspended from each carriage to lie below the track, means for giving continuous travel to said train of carriages and their suspended blocks, each of said block members presenting opposed jaws arranged to releasably grip the butt end of a hop vine and allow the vine proper to hang freely therefrom, a loading platform permitting foliage-laden vines to be manually hung from successive blocks in the train as the blocks approach the ingress end of the stripping throat, and means acting upon the stripped vines automatically in response to their travel beyond the throat and before reaching said loading platform for automatically freeing the vines from the jaws.

8. In a hop picking machine, a pair of endless picker belts each provided at spaced intervals of the circumference with transversely extending picking combs and supported one said belt in opposition to the other to define a picking throat therebetween, means for driving the belts to have the combs on adjacent surfaces thereof continuously travel in the same direction, and conveyor means movable in continuous travel progressively from one to the other end limit of said throat along a travel path outside the throat which is at approximate right angles to the path continuously travelled by said combs, means being provided by said conveyor means for engaging and giving travel to a hop vine so that the vine will move with the conveyor and completely traverse said throat moving without interruption progressively from one to the other end extremity of said throat along a travel path which is at approximate right angles to the path continuously travelled by said combs and with the foliage-bearing stem of the vine being disposed within the throat and approximately at right angles to the direction of its own travel.

9. In a hop picking machine, a pair of endless picker belts each provided at spaced intervals of the circumference with transversely extending picking combs, said belts being supported with one run of one belt opposing a run of the other belt and with said opposing runs converging in a direction transverse to the directional travel of the belts as they move along said opposing runs thus defining a flared picking throat between said opposing runs which narrows in a direction endwise to the rotary axes of the belts, means for driving the belts to have the combs continuously travel in the same direction as they move along the said opposed runs, and means for giving continuous travel to a hop vine to cause the vine to completely traverse said throat moving without motion endwise to its own axis progressively from one to the other end extremity of said throat entering at the wide end and leaving at the narrow end extremity thereof with the foliage-bearing stem of the vine, during said traversal, being positioned within the throat and at cross-angles to the direction of its own travel.

10. In a hop picking machine, a pair of endless picker belts each provided at spaced intervals of the circumference with transversely extending picking combs, said belts being supported with a run of one belt opposing a run of the other belt and with said opposing runs being disposed in vertical planes which converge horizontally to define a flared picking throat between the belts having a substantially uniform width from top to bottom and narrowing in a horizontal direction, means for driving the belts to have the combs along the two sides of the throat move in a downward direction, and means for giving continuous travel to a suspended hop vine to cause the vine to completely traverse the throat working without interruption progressively from one to the other extreme end limit of the throat with the direction of travel being from the wide to the narrow end of the latter.

11. In a hop picking machine, a pair of endless belts supported with a run of one belt opposing a run of the other belt with said opposing runs occupying converging vertical planes so as to define a flared throat therebetween, said belts being provided at equidistantly spaced intervals of the circumference with transversely extending picking combs which are vertically staggered as between said opposing runs of the two belts and lap one another at the narrow end of the throat, means for driving the belts to have the combs along the two sides of the throat move in concert at a uniform speed in a downward direction, and means for giving continuous travel to a succession of suspended hop vines to cause the vines to move through the full length of the throat working progressively without interruption toward the narrow end of the latter.

12. A hop picking machine according to claim 11 having means for adjusting the width of the throat at the wide admission end thereof without disturbing the spacing of the belts at the narrow end.

13. In a hop picking machine, a pair of endless belts each comprised of a plurality of endless chains trained top and bottom about sprocket wheels journaled for rotation about vertically spaced horizontal axes and mounted one belt alongside the other with the opposing inner runs of the belts occupying converging vertical planes to describe a flared picking throat therebetween, said belts being each provided at equidistantly spaced intervals of the circumference with transversely extending picking combs which are vertically staggered as between the two belts and lap one another at the narrow end of the throat, means for driving the belts to have the combs move in a downward direction along said opposing inner runs of the belts, means for giving continuous travel to a succession of suspended hop vines to cause the vines to move without interruption progressively through the picking throat entering at the wide end and leaving the narrow end of the latter, and supporting means bearing against portions of the outer sides of said opposing inner runs to resist outward bellying of the latter as the vines approach and traverse the narrow end of the throat.

References Cited in the file of this patent

UNITED STATES PATENTS

| Number | Name | Date |
|---|---|---|
| 509,906 | Hunt | Dec. 5, 1893 |
| 799,750 | Mundale | Sept. 19, 1905 |
| 1,008,914 | Horst | Nov. 14, 1911 |
| 1,054,360 | Miller | Feb. 25, 1913 |
| 1,834,479 | Taylor | Dec. 1, 1931 |
| 2,064,748 | Hinds | Dec. 15, 1936 |
| 2,193,354 | Thys | Mar. 12, 1940 |
| 2,274,793 | Keating | Mar. 3, 1942 |
| 2,412,627 | McGowan | Dec. 17, 1946 |
| 2,446,610 | Renfroe | Aug. 10, 1948 |
| 2,447,122 | Horst | Aug. 17, 1948 |
| 2,496,858 | Crowley | Feb. 7, 1950 |
| 2,536,927 | Griswold | Jan. 2, 1951 |
| 2,537,945 | Lewis | Jan. 16, 1951 |
| 2,539,688 | Berg | Jan. 30, 1951 |
| 2,570,844 | Oslund | Oct. 9, 1951 |